INVENTORS:
TOM M. HYLTIN
JACK S. KILBY
GERALD LUECKE
HAROLD D. TOOMBS

E. Mickey Hubbard
ATTORNEY

INVENTORS:
TOM M. HYLTIN
JACK S. KILBY
GERALD LUECKE
HAROLD D. TOOMBS

E. Mickey Hubbard
ATTORNEY

INVENTORS:
TOM M. HYLTIN
JACK S. KILBY
GERALD LUECKE
HAROLD D. TOOMBS

E. Mickey Hubbard
ATTORNEY 3,436,604
COMPLEX INTEGRATED CIRCUIT ARRAY AND METHOD FOR FABRICATING SAME Tom M. Hyltin and Jack S. Kilby, Dallas, and Gerald Luecke and Harold D. Toombs, Richardson, Tex., assignors to Texas Instruments Incorporated, Dallas, Tex., a corporation of Delaware
Filed Apr. 25, 1966, Ser. No. 545,077
Int. Cl. H02b *1/04;* H01l *19/00*
U.S. Cl. 317—101 23 Claims

ABSTRACT OF THE DISCLOSURE

A modular integrated circuit array is disclosed including a plurality of integrated circuit chips on each module. Coaxial transmission lines are utilized for interconnecting the integrated circuit chips on different modules in the array and may also be utilized for interconnecting the integrated circuit chips on a single module. Alternatively, some or all of the intramodule connections may be provided utilizing strip transmission lines.

This invention relates generally to integrated circuits, and more particularly relates to a high density integrated circuit modular array having transmission line interconnections for high speed operation and to a process for fabricating the modules of the array.

In digital data processing systems, the size and the speed of the system determine the volume of data which the system can process in a given period of time and are therefore of prime interest. Of equal importance is the cost of the system as related to the data which the system can process. Integrated circuit storage and logic circuits have considerable promise in digital system application because transistors and the resulting flip-flop storage circuits and logic gates having very high speeds of operation have been developed. Yields have been increased to the point that a large number of logic gates and other elements can be economically formed on a single substrate chip, and multilayer thin film techniques have been developed for interconnecting the components on the chips.

When operating a system at high speed, the logic data becomes high frequency information. This requires the use of transmission lines to transmit the data between components for minimum distortion. The high frequency also requires that propagation delays be maintained at a minimum. Thus it becomes important to provide a high density of circuit functions in order to reduce the propagation delays when transmitting the high frequency information from one part of the system to another. Individual integrated circuit chips have a high component density and the thirty or forty logic gates formed on each chip may be interconnected by thin film leads usually less than about 50 mils in length so that transmission lines are not required between the components on each chip. However, each chip has a large number of connections which must be made to other components within the system and a large number of transmission lines many times longer than 50 mils. Thus the problem of achieving high component density throughout the system is frustrated as much by the large number of transmission lines required as by any other factor. For transmission paths greater than about 50 mils in length, the characteristic impedance of the transmission line must be rather carefully controlled to prevent impedance discontinuities which would disrupt or degrade operation of the system. Coaxial transmission lines are very efficient for transmitting high frequency data, but coaxial lines of sufficiently small diameter for use in connection with high density integrated circuit arrays are not available and would be very difficult to manufacture in a form which would be sufficiently flexible and tough to withstand the handling necessary to use the wire in an integrated circuit array.

An important object of this invention is to provide a modularized integrated circuit array having a high component density.

Another object of the invention is to provide such a module wherein interconnections between components that are greater than about 50 mils in length are made by transmission lines having a controlled characteristic impedance.

A further object is to provide a substrate for a module having a plurality of integrated circuit chips which provides transmission lines for interconnecting the chips including terminating resistors, a heat sink, and a power supply.

Another important object of the invention is to provide such a substrate which utilizes highly efficient coaxial transmission lines which may selectively extend transversely of the module, longitudinally of the module, transversely and longitudinally of the module, or from module to module for interconnecting substantially any two chips in the array.

A further object of the invention is to provide a substrate for an integrated circuit array which provides a large number of transmission lines and which permits considerable flexibility in the type of integrated circuits which can be mounted thereon and the manner in which the circuits and modules can be interconnected.

Another important object of the invention is to provide a process for fabricating such a substrate.

These and other objects are accomplished by a modular array featuring a module having a substrate comprised of a body having a face upon which a number of integrated circuit chips are mounted. Each of a plurality of coaxial transmission lines extends away from the chips from a first point adjacent an edge of the face and returns to a second point spaced from the first point adjacent an edge of the face. The ends of the conductors of the coaxial transmission lines are exposed so that the conductors can be connected to the integrated circuit chips by bonded lead wires or the like. One or more of the coaxial transmission lines may extend from the module for connection to another module in the array.

In accordance with a more specific aspect of the invention, the body includes a core which may include an elongated heat sink bar, an elongated power bus and an elongated sheet of strip transmission lines. The coaxial transmission lines extend partially around the core and the transmission lines of the core are preferably encased in a suitable potting material such as plastic for rigidity. A strip of terminating resistors may also be included in the module for terminating any one of the transmission lines in its characteristic impedance.

In accordance with another important aspect of the invention, a process for fabricating the substrate for the module is provided which includes the steps of positioning a plurality of flexible cables having center conductors surrounded by an insulating layer in the approximate relative positions the conductors are to occupy in the completed module, and then substantially plating the insulating layers with metallized layers to form coaxial transmission lines. More specifically, the flexible cables are positioned in predetermined relationship to a core before the insulating layers of the cables are metallized to form coaxial transmission lines, and then the center conductors of the transmission lines are exposed at points adjacent the positions where the integrated circuit chips are to be mounted on the core so that the center conductors can be electrically connected to the integrated circuit chips by relatively short lead wires using conventional ball bonding techniques.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
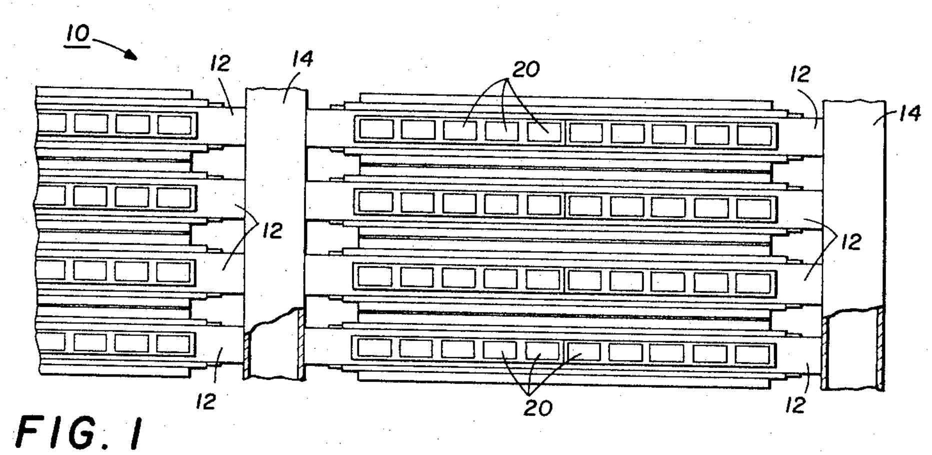
FIGURE 1 is a plan view of a modular integrated circuit array constructed in accordance with the present invention.

Referring now to the drawings, and in particular to FIGURES 1–5, a portion of a modular integrated circuit array constructed in accordance with the present invention is indicated generally by the reference numeral 10. The array 10 is comprised of a plurality of elongated modules 12 disposed in side-by-side generally coplanar relationship. The ends of the modules 12 abut conduits 14 which carry a suitable cooling fluid so that heat generated in the modules will be transferred to the cooling fluid and removed from the array.

Each module 12 is typically about 0.25 inch in width and about 2.5 inches in length. Each module has an elongated core which includes an elongated thermally conductive bar 16, preferably metal, which extends between two conduits 14 and serves as a heat sink and electrical ground. A strip transmission line sheet 18, which may comprise several sections, is mounted on the bar 16, and ten integrated circuit chips 20 are mounted on the sheet 18. The strip transmission line sheet 18 may be comprised of a sheet 19 of high resistivity silicon, intrinsic gallium arsenide, or other material having a high resistivity or insulating properties and a thickness which can be accurately controlled. The sheet 19 has a metallized ground plane 21 on the bottom side adjacent the bar 16, and first and second strip line levels 22 and 23 which extend transversely and longitudinally of the module, respectively, and are separated by insulating layers 24. Interconnections between the layers are made at 23*a* by leaving openings in the underlying insulating layer as the film from which the lines 23 are formed is deposited. Expanded contact pads 25 are formed in the same manner. These strip lines may be formed by thin film techniques such as described in U.S. Patent No. 3,366,519, issued Jan. 30, 1968. Each integrated circuit chip 20 may contain the circuit components for a large number of logic gates or other logic elements, typically twenty-five gates, and the components for the various logic elements, as well as the elements, are also interconnected by multilayer thin film circuits represented schematically by the layer 26, and all portions of the thin film interconnecting circuits which are to be connected to circuits outside the respective chip 20 are terminated in expanded contact pads represented at 27 in FIGURE 4. Strip transmission lines are not required for the intrachip interconnections because substantially all connections on an individual chip will be less than about 50 mils in length.

The strip transmission line sheet 18 may have more or less than two layers of conductors and the conductors may or may not extend under the chips 20. The strip transmission lines may extend either longitudinally of the module, transversely of the module, or both longitudinally and transversely of the module so that any point on one of the chips 20 may be connected to any point on any other chip. Since these transmission lines will invariably exceed 50 mils in length, the characteristic impedance of the transmission lines should be carefully controlled. For this reason, the silicon sheet 19 has a precise thickness and resistivity. Then by controlling the width of the strip lines 22 and 23, the characteristic impedance of the strip transmission lines can be rather closely controlled. Even when multiple layers of transmission lines are formed by successively sandwiching thin metallized films on thin layers of insulating material, the spacing between the strip transmission lines and the ground plane 21 will not vary to an extent sufficient to change the characteristic impedance of the strip transmission lines beyond acceptable limits.

The heat sink bar 16 is preferably formed of metal and also serves as the ground for the system. In addition to the strip transmission line sheet 18, the core also includes a pair of elongated power busses 30 which extend along each side of the heat sink bar 16. One edge of each power bus 30 is coplanar with the upper surface of the heat sink bar 16, and the power busses 30 are insulated from the heat sink bar 16 by an envelope 34 of a suitable insulating material such as plastic. Although the power busses 30 are located at the outer edge of the bar 16, the busses may be located at any transverse point within the core so long as they are exposed at the upper surface of the core and are accessible so that lead wires can be bonded to the busses.

Figures 2, 5:
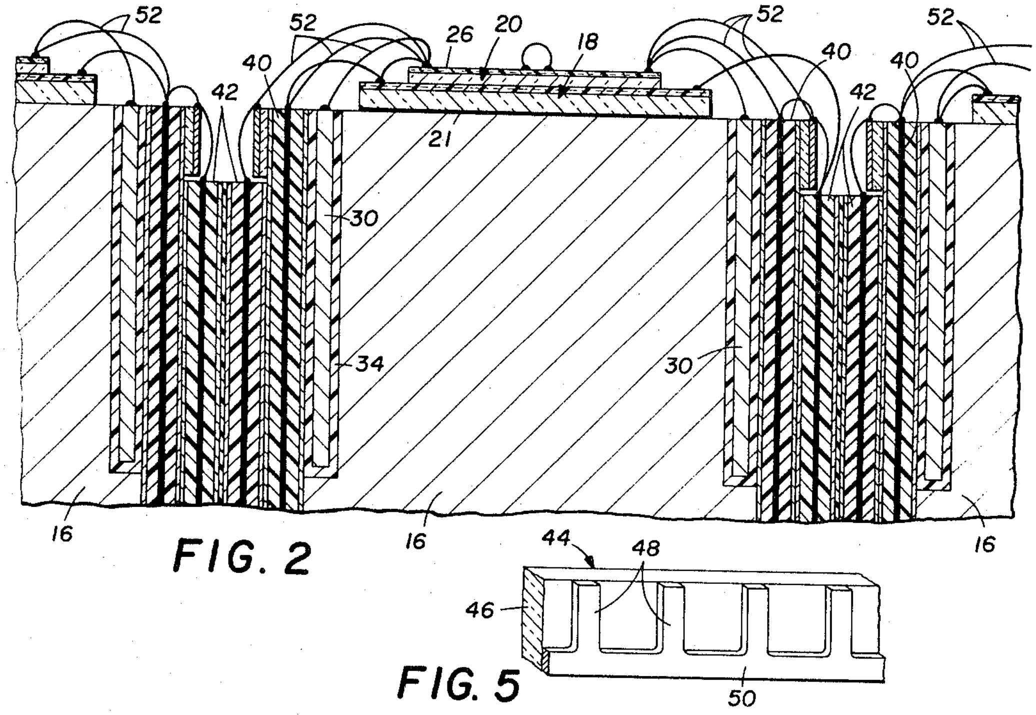
FIGURE 2 is partial sectional view of three modules of the array of FIGURE 1.
FIGURE 5 is a simplified isometric view of the terminating resistor board used in the system of FIGURE 1.

An inner row of coaxial transmission lines 40 is positioned along each edge of the heat sink bar 16 and the upper ends are ground off at an angle to the axes of the lines so as to expose the ends of the center conductors. An outer row of cables 42 is disposed adjacent each inner row of cables 40 and the upper ends of the cables 42 are also ground off so as to expose the ends of the center conductors. However, the cables 42 are ground off at a point below the ends of cables 40 as best seen in FIGURE 2 so that a resistor board 44 can be affixed to the side of each inner row of cables 40. The resistor board 44 preferably extends for substantially the length of the module and may be formed substantially as illustrated in FIGURE 5 by depositing a metallic layer on a ceramic bar 46 to provide a plurality of resistors 48 which are integral with a ground strip 50. Each of the resistors 48 has a resistance matching the characteristic impedance of the coaxial transmission lines 40 and 42 so that the transmission lines can be properly terminated where required by interconnecting the center conductor of the transmission line and the upper end of the resistor.

Each of the transmission lines 40 and 42 extends downwardly away from the chips 20 and then re-emerges adjacent another chip 20. More specifically, any one of the transmission lines may extend from a point on one side of the heat sink bar 16 to the same side of the bar, to the opposite side of the bar or from the bottom of the module for connection to a transmission line extending to another module in the array in the manner illustrated in FIGURE 9 and hereafter described in greater detail in connection with the process for fabricating the module substrate. The particular arrangement of the transmission lines 40 and 42 will be determined by the requirements of a particular array. This is equally true of the transmission lines formed in the sheet 18, and the number of transmission lines of either type may be varied as required. The shields of the coaxial transmission lines 40 and 42 are preferably in intimate contact one with the other and with the bar 16 so as to be well grounded.

Figure 4:
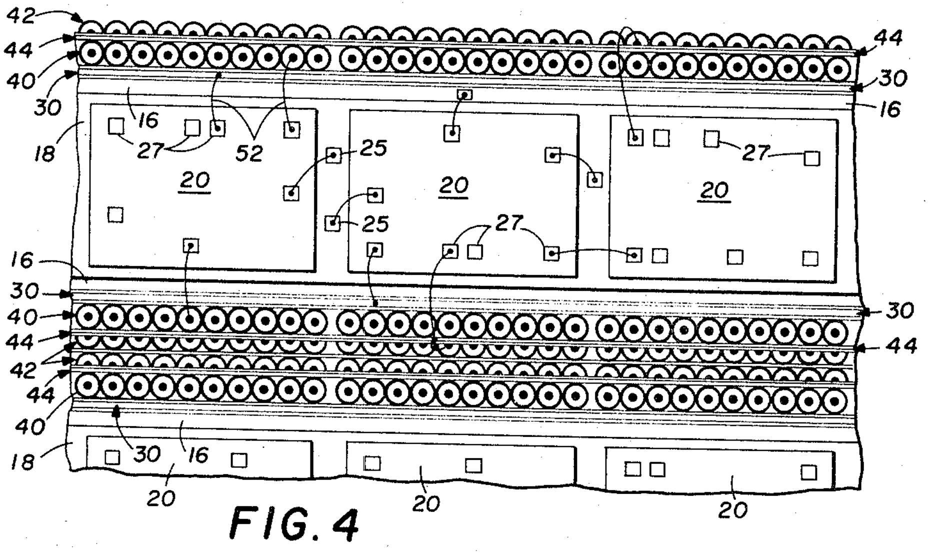
FIGURE 4 is an enlarged, partial plan view of two modules of the array of FIGURE 1.
Figure 3:
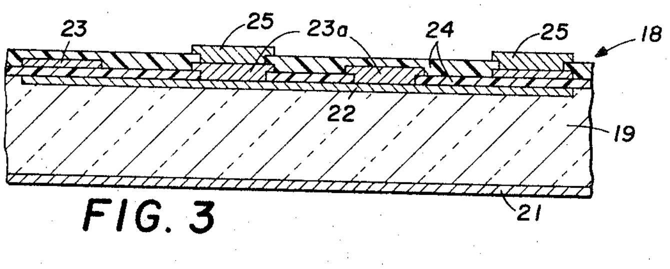
FIGURE 3 is an enlarged sectional view of the multilayer strip-line member used in the module of FIGURE 1.

As can be seen in FIGURES 2 and 4, the ends of the conductors of the coaxial transmission lines 40 and 42 may be selectively connected by standard small diameter lead wires, indicated collectively by the numeral 52, and ball bonding techniques to any adjacent part of the module as illustrated in FIGURE 2. For this reason, the upper surface of the module should be generally flat to facilitate the lead wire bonding process. For example, lead wires may be bonded from any one of the transmission lines to pads 27 or 25. In cases where the transmission line must be terminated in its characteristic impedance, the end of the line may be connected first to the end of a terminating resistor 48, then be connected to one of the expanded contact pads 27. Ball bonded lead wires 52 may also be used to interconnect the expanded contact pads 27 on adjacent chips 20, the power busses 30 and the contact pads 27 and 25, and the grounded bar 16 and the shields of the transmission lines, etc. Thus it will be appreciated that great flexibility is provided by the combination of the coaxial transmission lines 40 and 42 and the strip transmission lines in the sheet 18 for making a large number of connections between any two points on each module, even though spaced both longitudinally and transversely on the face of the module, and also for connection with similar contact pads on chips located on any module within the array 10.

Figure 6:
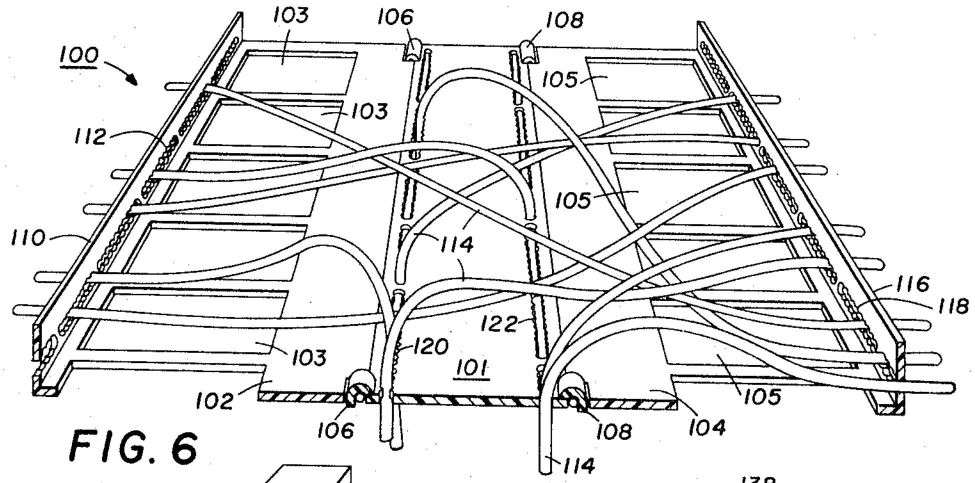
FIGURES 6, 7, 8 and 9 are perspective views illustrating a process of this present invention for fabricating a module substrate which may be used in an array such as illustrated in FIGURE 1.

In accordance with another important aspect of the invention, a process is provided for fabricating the substrates for modules of an integrated circuit array. This process is illustrated in FIGURES 6–9. The process may be carried out using a fixture such as illustrated in FIGURE 6 and indicated generally by the reference numeral 100 which is comprised of a base plate 101 having side members 102 and 104 which are pivotally connected to the base plate by hinge means 106 and 108. The side members 102 and 104 are provided with large openings 103 and 105 to permit plating solutions and potting materials to flow freely therethrough. The side member 102 has a flange portion 110 having a row of holes 112 for receiving the ends of standard Teflon insulated wires 114 of very small diameter. The insulated wires are flexible and relatively easy to work with without danger of damage to the wires. Other types of plastic insulation can be used if desired. The side member 104 has a similar flange portion 116 and a row of holes 118 for receiving the ends of the wires 114. The bottom plate 101 has two rows of holes 120 and 122, one along each edge. As illustrated, single rows of holes 112 and 118 are provided, although as will hereafter become more evident, a double row of holes could be provided in either or both flange portions 110 and 116.

Figures 7, 8, 9:
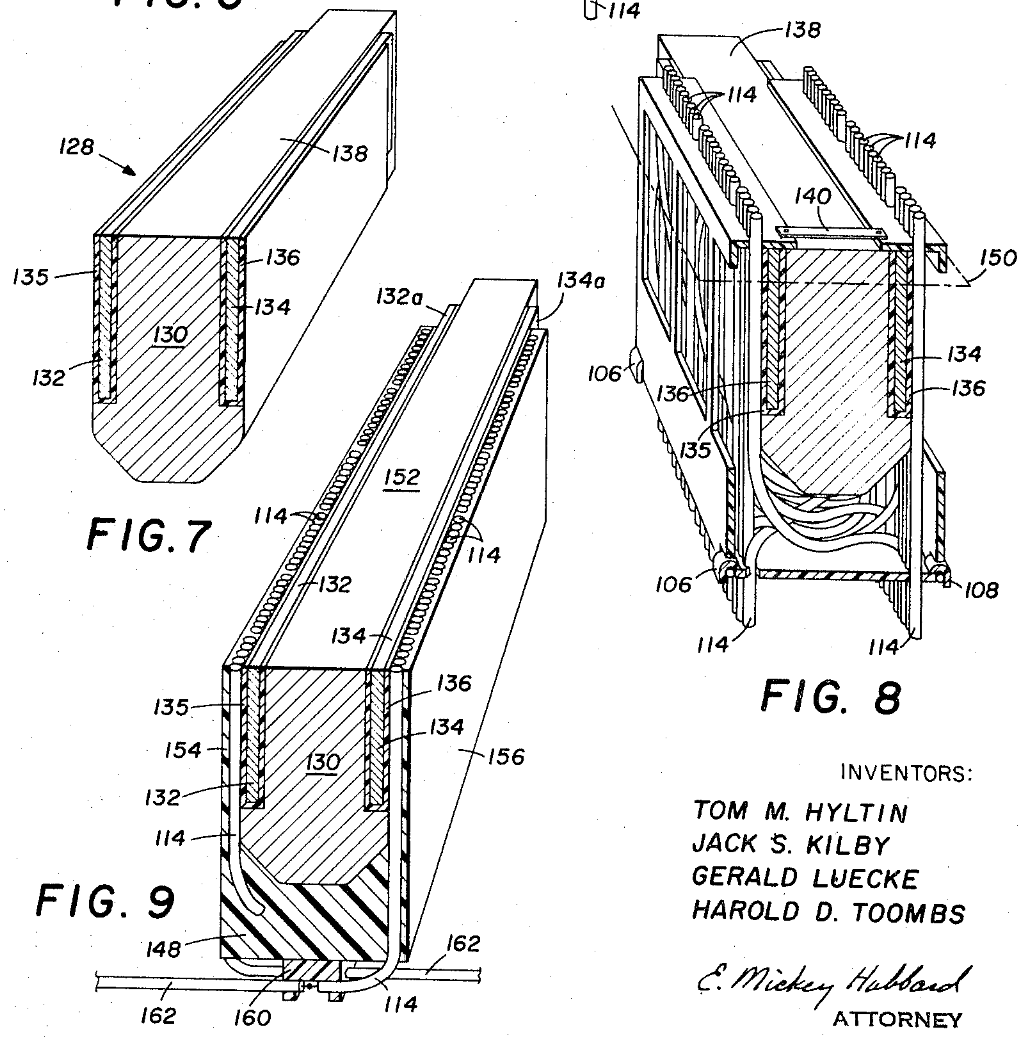

The fixture illustrated in FIGURE 6 is adapted to be folded around the core illustrated in FIGURE 7 and indicated generally by the reference character 128. The core 128 is comprised of an elongated heat sink and ground bar 130 and a pair of metallic power busses 132 and 134 which extend along each side of the bar 130 and are electrically insulated from the bar 130 by suitable envelopes 135 and 136 formed of an insulating material, preferably Teflon or the same material used to insulate the wires 114. The fixture 100 is sized such that when the two side members 102 and 104 are folded upwardly to a vertical position, the flange portions 110 and 116 will extend over the top surface 138 of the core 128 substantially as illustrated in FIGURE 8, and the insulated conductors 114 projecting through the rows of openings 112 and 118 will be pressed against the sides of the core 128 and aligned in rows. The fixture 100 may be held in place around the core by a suitable fastening strap 140. Thus it will be noted that an insulated wire may be strung from a hole in the row 112 to another hole in row 112, or to a hole in one of the rows 118, 120 or 122, depending upon the requirements of a particular data system. Similarly, a wire extending through any one of the holes in the row 118 might extend through another hole in row 118, or through a hole in one of the rows 112, 120 or 122. The rows of holes 120 and 122 are provided on opposite sides of the bottom plate 101 so that a wire that is to extend to a module to the right can be passed through the left-hand row of holes 120 and then bent in a smooth curve back to a connection fixture 160, and a wire that is to extend to a module to the left can be passed through the right-hand row of holes 122 and bent back to the fixture 160. It should be noted that only a portion of the wires are illustrated in FIGURE 6 for simplicity. Of course, all of the positions for the wires may or may not be filled, depending upon the requirements of a particular system, and the number of positions may be increased to provide two rows of conductors as illustrated in FIGURE 2 if desired.

Next, the entire assembly shown in FIGURE 8 is plated with metal using a standard electroless plating procedure. For example, all surfaces, including the plastic insulation around the wires 114, which is preferably Teflon, the plastic fixture 100 holding the wires, and the plastic insulation around the power busses 132 and 134, are then activated by conventional palladium chloride solutions and techniques. Then the assembly is placed in an electroless copper plating or nickel plating solution, of which many are known in the art, and a thin electrically conductive film of copper or metal deposited over the entire exposed surface of the assembly. Electrical contact is then made with the film and the film thickened substantially by a conventional electroplating process so that all of the insulated conductors 114 will be fully coated in a metal envelope thereby forming coaxial transmission lines. In this regard, it will be appreciated that even though the shield has numerous pinholes or other imperfections, it will nevertheless function quite satisfactorily as a coaxial transmission line shield. A desirable consequence of the process is that all of the shields are in intimate contact and therefore at the same ground potential.

After the assembly has been plated with metal, it is preferably encased in a suitable plastic 148 to provide additional structural rigidity and simplify subsequent machining. This is accomplished merely by placing the assembly in a suitable injection mold and injecting plastic into the voids within the assembly. The plastic fixture 100 may also be potted, and is preferably of a material that is strongly adherent to the potting plastic 148 so that subsequent processing of the assembly will not cause the two materials to separate.

Next, the excess portions of the potted assembly are removed and the operative portions exposed. In particular, the upper surface of the potted assembly is removed down to approximately the plane of the dotted line 150 in FIGURE 8, thus exposing the ends of the wires 114, the edges of the power supply bus strips 132 and 134 and the upper surface 152 of the heat sink member 130. The sides 154 and 156 of the module may also be shaved away to reduce the transverse width of the module and thereby increase the overall packing density in the array. The ends of the module may be processed so as to expose the ends of the power busses 132a and 134a for connection to power supplies after the module is inserted in its position in the array. The ends of the conductors 114 extending from the bottoms of the module may then be processed as desired, such as by placing them in the strip connector 160 fastened along the bottom of the potting plastic 148 for ultimate connection to coaxial transmission lines 162 extending to a similar connection at another module in the array. Integrated circuit chips may then be mounted on the surface 152, either directly upon the surface, or upon an underlying silicon sheet carrying strip transmission lines such as the strip transmission line sheet 18 in FIGURE 2.

Figures 10, 11:
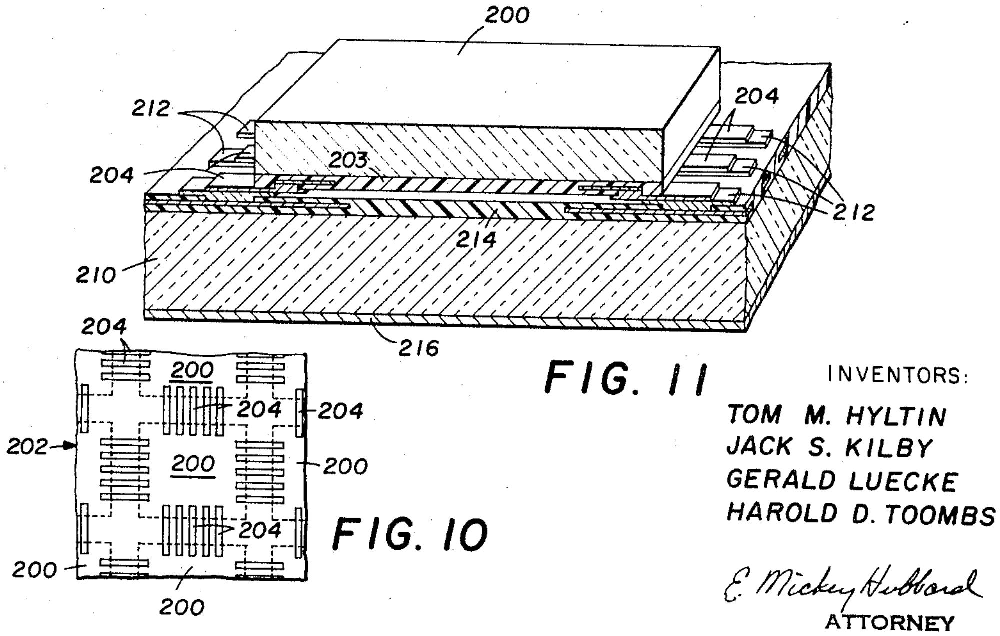
FIGURE 10 is a somewhat schematic plan view of a portion of a semiconductor slice illustrating a step in the fabrication of an integrated circuit chip which may be used in the array of FIGURE 1.
FIGURE 11 is a somewhat schematic isometric view illustrating one method for mounting the semiconductor chip formed by the process illustrated in FIGURE 10 on a module substrate in accordance with the present invention.

As illustrated in FIGURE 2, all connections between the circuit formed on the integrated circuit chip 20 and the remainder of the array are made by ball-bonded leads. An alternative process for both mechanically mounting the integrated circuit chips 20 of the module substrate and for making electrical connections with the circuit formed on the integrated chip is illustrated in FIGURES 10 and 11. In the initial stages of the process of manufacturing the integrated circuit chips, the various components of the circuit are diffused, or otherwise formed, within the areas 200 illustrated in dotted outline on a single slice of semiconductor material 202. The various components of the individual circuits within each of the areas 200 are then interconnected by thin film circuits such as heretofore described in connection with FIGURE 3 which are confined within the areas 200 on the surface of the substrate. These thin film circuits are represented generally by the layer 203 in FIGURES 11 and 12. Finally, leads which are to extend from this circuit to portions of the array outside of the particular chips 200 are then formed on the surface of the layer 203 by first using standard thin film techniques to form short strip conductors 204 extending between the areas 200. The strips 204 preferably extend between adjacent chips to provide a means of mechanically interconnecting the chips during the processing as will presently be described. The lead strips 204 are then substantially increased in thickness by standard electroplating techniques to produce leads of considerable structural integrity. Then the semiconductor slice 202 is etched through form the opposite side so as to separate the slice into the chips 200. Then the leads 204 are severed at the midpoints so as to provide a single semiconductor chip 200 having a plurality of leads 204 cantilevered out from the surface of the chip which are in electrical contact with the various conductors in the layer 203.

Figure 12:
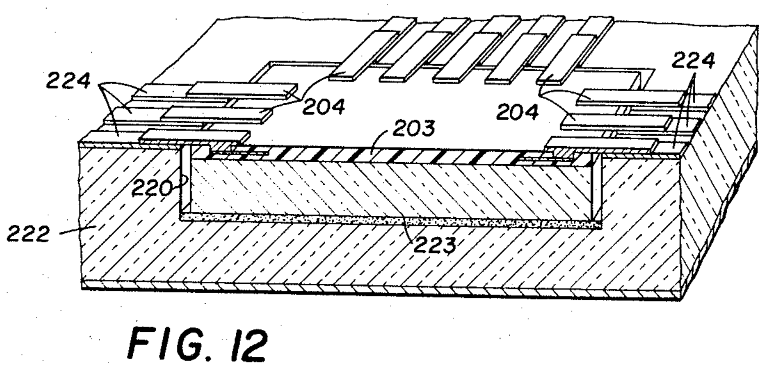
FIGURE 12 is a somewhat schematic isometric view similar to FIGURE 11 illustrating another method for mounting the semiconductor chip on a module substrate.

The integrated circuit chip 200 thus prepared may be mounted either as illustrated in FIGURE 11 or 12. In FIGURE 11, the chip 200 is inverted and mounted face down on a substrate 210. The substrate 210 is provided with a plurality of metallized contact pads 212 which are oriented to mate with the cantilevered ends of the leads 204, and these metallized pads may be connected to thin film circuits located within a circuit layer 214 by parallel gap welding or other conventional techniques. The substrate 210 preferably has a carefully controlled thickness and resistivity and a metallized ground plane 216 on the opposite surface thereof so that strip conductors of controlled widths within the layer 214 will form transmission lines having a constant selected characteristic impedance.

An alternative means of mounting the chips 200 is illustrated in FIGURE 12. In FIGURE 12, the chip 200 is mounted right side up within a cavity 220 formed in the surface of a semiconductor or ceramic substrate 222. The cavity 220 is the same depth as the thickness of the chip 20, and the chip 20 is cemented in place by a bonding layer 223 having good heat transfer characteristics. The cantilevered leads 204 then extend over strip conductors 224 on the surface of the substrate 222 and may be connected thereto by parallel gap welding or other conventional technique.

From the above detailed description of preferred embodiments of the invention, it will be evident that a modular integrated circuit array has been described which has a high component density and wherein the heat generated by the system may be efficiently carried away. But more importantly, a large number of transmission lines are provided in a minimum amount of space for interconnecting the integrated circuit chips on a single module and for interconnecting the chips on different modules in the array. In many cases, all such connections can be made by coaxial transmission lines the shields of which are very efficiently grounded so as to provide the best possible performance. Intramodule connections may also be made using strip transmission lines in the event the coaxial transmission lines do not provide all of the connections necessary. A unique module substrate for integrated circuit arrays and a process for fabricating the module substrate has been described in which very fine insulated conductors, which are flexible and easy to handle without danger of damaging the conductors, are placed in position and then a metallized shield formed around the conductors. The coaxial transmission lines may be arranged in any desired manner to provide a custom substrate, and may be used to make either intramodule or intermodule connections.

Although preferred embodiments of the invention have been described in detail, it is to be understood that various changes, substitutions and alterations can be made therein without departing from the spirit and scope of the invention as defined by the appended claims.

What is claimed is:

1. A substrate for mounting a plurality of integrated circuit chips to form a module for an integrated circuit array comprising a body having a face upon which the integrated circuit chips can be mounted a plurality of coaxial transmission lines, each of said coaxial transmission lines respectively extending from first points adjacent an edge of the face away from the face and returning to second points spaced from the first points adjacent an edge of the face, the ends of the conductors of the coaxial transmission lines being exposed, said exposed ends being adapted to be electrically connected to one or more circuits, and support means for rigidly supporting portions of said transmission lines extending between such first and second points.

2. The substrate defined in claim 1 wherein the body includes an elongated generally rectangular bar fabricated from a thermally conductive material and having a top face, two generally parallel side faces disposed generally at right angles to the top face and two generally parallel end faces disposed generally at right angles to the top face, at least one of the end faces being adapted to make heat transferring contact with a heat sink for cooling the body.

3. The substrate defined in claim 1 wherein the body is elongated and is comprised of at least two electrically conductive portions extending longitudinally of the body and electrically isolated one from the other, and exposed adjacent the face whereby the electrically conductive portions may supply electrical power to operate the circuits of integrated circuit chips mounted on the flat face through lead wires bonded between the exposed electrically conductive portions and the integrated circuit chips.

4. The substrate defined in claim 1 further characterized by a resistor strip extending generally parallel to the face having a plurality of terminating resistors at spaced intervals therealong which are terminated to ground and have an impedance substantially matching the characteristic impedance of the transmission lines, one end of each resistor being exposed adjacent the flat surface whereby a transmission line may be terminated through one of the resistors by connecting the transmission line to the resistor with a bonded lead wire.

5. The substrate defined in claim 1 wherein the face is formed by at least one layer of transmission strip lines extending generally parallel to the face and having expanded contact pads at each end thereof exposed at the face whereby the ends of the transmission lines may be electrically connected to the integrated circuit chips by bonded lead wires and the transmission lines will interconnect two or more integrated circuit chips on the substrate.

6. The substrate defined in claim 1 wherein the face is defined by a pair of generally parallel edges and wherein at least one of the coaxial transmission lines extends from a first point adjacent one edge of the face to a second point adjacent the same edge of the face spaced from the first point.

7. The substrate defined in claim 1 wherein the face is defined by a pair of generally parallel edges and wherein at least one of the coaxial transmission lines extends from a first point adjacent one edge of the face to a second point adjacent the other edge of the face.

8. The substrate defined in claim 1 further characterized by at least one coaxial transmission line extending from a point adjacent the face to an exit point from the substrate remote from the face for connection to another substrate of an integrated circuit array.

9. The substrate defined in claim 1 wherein a portion of the body is formed by a solid potting material and the coaxial transmission lines are disposed in the potting material substantially between the first and second points.

10. A module for an integrated circuit array comprising a body having a face, a plurality of integrated circuit chips mounted on the face, a plurality of coaxial transmission lines each electrically connected at one end to an integrated circuit chip and extending from the face into the module and returning to the face and being electrically connected at the other end to an integrated circuit chip, and support means for rigidly supporting portions of said transmission lines within said module.

11. The module defined in claim 10 wherein the coaxial transmission lines extend through a solid potting material forming a part of the body.

12. The module defined in claim 10 wherein the body includes an elongated thermally conductive bar in thermal transfer relationship with the integrated circuit chips, and wherein at least one of the coaxial transmission lines extends partially around the bar.

13. A module for an integrated circuit array comprising an elongated core having a face and a pair of generally parallel sides adjacent to the face defining the edges of the face, a plurality of integrated circuit chips mounted on the face, a plurality of coaxial transmission lines electrically connected at one end to an integrated circuit chip and extending away from the face along one of the sides of the core and returning to the face and being electrically connected at the other end to an integrated circuit chip, and support means for rigidly supporting portions of said transmission lines between said one end and said other end in a position along one of the sides of the core.

14. The module defined in claim 13 wherein at least one of the transmission lines extends from one edge of the face around the core to the other edge of the face.

15. The module defined in claim 13 wherein at least one of the coaxial transmission lines extends from one edge of the face along one side of the core and back to the same edge of the face.

16. The module defined in claim 13 further characterized by at least one transmission line connected at one end to an integrated circuit chip and extending away from the face along one side of the core and emerging from the module at a point remote from the face for connection to another module in an array.

17. The module defined in claim 13 wherein a substantial portion of the transmission lines and a portion of the core are encased in a solid potting material.

18. The module defined in claim 13 wherein the core includes a thermally conductive bar extending substantially the length thereof and in heat transfer relationship to the integrated circuit chips mounted on the core.

19. The module defined in claim 13 wherein the core includes an electrically conductive bus extending substantially the length of the core and exposed at the face for substantially the length of the bus.

20. The module defined in claim 13 wherein the core includes at least one layer of strip transmission lines having contact pads exposed at the surface, and means electrically interconnecting the contact pads and the integrated circuit chips.

21. In a modular integrated circuit array, the combination of a plurality of elongated, generally rectangular modules each comprising a substrate member having a face upon which a plurality of integrated circuit chips are mounted, a pair of generally parallel side faces and a pair of generally parallel end faces disposed generally normal to the planar surface, the modules being disposed in side-by-side relationship with the faces on which the integrated circuit chips are mounted generally coplanar, a plurality of coaxial transmission lines extending from points adjacent the integrated circuit chips into each module and back out to points adjacent other integrated circuit chips, the conductors of the coaxial transmission lines being exposed adjacent the top surface of the modules, support means for supporting portions of said coaxial transmission lines extending into each module and for maintaining said exposed conductors in a substantially rigid position, and means electrically interconnecting the ends of the conductors of the coaxial transmission lines and the adjacent integrated circuit chips.

22. The substrate defined in claim 21 further characterized by at least one coaxial transmission line extending from a point adjacent an integrated circuit chip of one of the modules out of said module and through another module of the array to a point adjacent another integrated circuit chip, and means electrically interconnecting each end of the coaxial transmission line and the respective integrated circuit chip.

23. In a modular integrated circuit array, the combination of a plurality of modules each comprising a substrate member having a top face upon which a plurality of integrated circuit chips are mounted, the modules being disposed in side-by-side relationship with the top faces thereof generally coplanar, at least one coaxial transmission line extending from a point adjacent an integrated circuit chip of a first of the modules down through and out of said first module to a second module and up through said second module to a point adjacent an integrated circuit chip on said second module, support means for rigidly supporting portions of said at least one coaxial transmission line extending down through said first module and up through said second module, and means electrically interconnecting the ends of the coaxial transmission line to the adjacent integrated circuit chip.

References Cited

UNITED STATES PATENTS

| | | | |
|---|---|---|---|
| 3,191,100 | 6/1965 | Sorvillo. | |
| 3,234,433 | 2/1966 | Braunagel. | |
| 3,271,625 | 9/1966 | Caracciolo. | |
| 3,293,353 | 12/1966 | Hendriks et al. | 174—36 |

LEWIS H. MYERS, *Primary Examiner.*

J. R. SCOTT, *Assistant Examiner.*

U.S. Cl. X.R.

174—68.5